(12) United States Patent
Brook

(10) Patent No.: US 8,087,606 B2
(45) Date of Patent: Jan. 3, 2012

(54) DRAG-REDUCTION, PROPULSION, AND LIFT GENERATING SYSTEM

(76) Inventor: Sapoty Brook, Mullumbimby (AU)

( * ) Notice: Subject to any disclaimer, the term of this patent is extended or adjusted under 35 U.S.C. 154(b) by 741 days.

(21) Appl. No.: 11/991,442

(22) PCT Filed: Oct. 4, 2006

(86) PCT No.: PCT/AU2006/001438
§ 371 (c)(1),
(2), (4) Date: Mar. 5, 2008

(87) PCT Pub. No.: WO2007/038831
PCT Pub. Date: Apr. 12, 2007

(65) Prior Publication Data
US 2009/0317249 A1 Dec. 24, 2009

(30) Foreign Application Priority Data
Oct. 4, 2005 (AU) ................. 2005905450

(51) Int. Cl.
*B64C 233/00* (2006.01)
(52) U.S. Cl. ........................ 244/1 R; 244/130
(58) Field of Classification Search .................. 244/1 R, 244/1 N, 1 A, 159.1, 130, 53 R
See application file for complete search history.

(56) References Cited

U.S. PATENT DOCUMENTS

| | | | | |
|---|---|---|---|---|
| 2,995,317 A * | 8/1961 | Schoppe | ................. | 244/53 R |
| 3,224,375 A * | 12/1965 | Hoff | ................. | 244/159.1 |
| 3,259,065 A * | 7/1966 | Ross et al. | ................. | 244/3.1 |
| 3,620,484 A * | 11/1971 | Schoppe et al. | ................. | 244/130 |
| 5,353,711 A * | 10/1994 | Botticelli et al. | ................. | 102/490 |
| 7,648,100 B2 * | 1/2010 | Kremeyer | ................. | 244/1 R |

* cited by examiner

*Primary Examiner* — Galen Barefoot
(74) *Attorney, Agent, or Firm* — N. R. Jennings; Kilburn & Strode LLP

(57) ABSTRACT

A motion generating system for propelling and/or lifting a craft exploiting explosive and implosive processes, whereby a propulsive or lifting force on the craft arises from two sources: generation of a stream of fluids which imparts thrust to the craft; and generation of zones of reduced pressure and density in front of and above the craft allowing the craft to be thrust forward and lifted by ambient pressure on the rear and underside of the craft. Furthermore, reduction of fluid density in front of the craft results in a reduction of frontal drag allowing the attainment of higher speeds. The motion generating system may have other applications; for example, the motion generating system may be used to propel a stream of liquid in the manner of a pump.

10 Claims, 11 Drawing Sheets

DRAG-REDUCTION, PROPULSION, AND LIFT GENERATING SYSTEM

TECHNICAL FIELD

The invention relates to a motion generating system to control the relative motion between an object and adjacent fluids.

The invention has been devised particularly, although not solely, as a motion generating system for propelling and/or lifting a craft exploiting explosive and implosive processes, whereby a propulsive or lifting force on the craft arises from two sources: generation of a stream of fluids which imparts thrust to the craft; and generation of zones of reduced pressure and density in front of and above the craft allowing the craft to be thrust forward and lifted by ambient pressure on the rear and underside of the craft. Furthermore, reduction of fluid density in front of the craft results in a reduction of frontal drag allowing the attainment of higher speeds. The motion generating system may have other applications; for example, the motion generating system may be used to propel a stream of liquid in the manner of a pump.

BACKGROUND INFORMATION

It is well known for water and air craft the primary limitation on speed is drag: terminal velocity is reached when the thrust force is matched by the drag force. It is also well known that the ambient pressure of fluids at sea level is about one hundred thousand Newton per square meter. Fractional imbalances in this pressure on an object can result in very high thrust forces and accelerations. It is conceivable that a craft could attain very high speed and acceleration under conditions of reduced frontal drag and reduced frontal ambient pressure.

It is well known that, according to the kinetic theory of gases, the pressure p exerted by the gas molecules on a stationary wall is proportional to the square of the root mean square velocity $V_{rms}$ of the molecules. The pressure p is given by $$p = (dV_{rms}^2)/3$$

where d is the density of the ideal gas. If the gas is brought to a thermodynamic state where it undergoes a phase change to a liquid or solid state then most of the molecules attract together. The density of the gas reduces and there is a corresponding pressure drop or implosion. The heat of condensation opposes the phase change and pressure drop, and a coolant or heat sink must absorb the heat if the phase change is to continue.

If a gas undergoes condensation on contact with a cooler surface then the partial pressure exerted by the condensing gas molecules is half of the pressure that would have been exerted on the surface if the molecules had elastically rebounded. As a result of the reduced pressure, if a cloud of vapor remains in contact with the cool surface, it moves towards the cool surface and condenses on it. Also the cool surface will move towards the cloud of vapor if free to do so. This dynamical behaviour can be maintained as long as the surface remains cool and the stream of condensing vapor is replenished.

Brown's gas is a stoichiometric mixture of hydrogen and oxygen allowing complete combustion to form pure steam. It can be produced by electrolysis of water. It is dangerous to store in larger quantities due to its highly explosive nature. If a cool heat sink is provided in contact with the explosion there can be a subsequent rapid implosion as a result of condensation of the steam.

Various systems are known for propelling craft, including motor-driven propellers, and jet propulsion units which produce thrust by discharge of a stream of fluid.

U.S. Pat. No. 3,402,555 (Piper) discloses a steam jet nozzle system for propelling watercraft. In the nozzle system, steam is generated and discharged under high pressure to provide propulsion. The nozzle system includes a nozzle having an entrance end and an exit end. Steam enters the nozzle through the entrance end. Raw water from the body of water through which the watercraft is to be propelled is introduced into the nozzle so as to be converted into steam to supplement the steam already in the nozzle. The propulsion is not provided by a jet stream of water but rather by generation and discharge of steam under high pressure.

U.S. Pat. No. 6,662,549 (Burns) discloses a propulsion system for generating a fluid stream utilising a driving fluid without relying solely on momentum transfer. Burns discloses a propulsion system comprising a flow passage having an intake, for communicating with a source of working fluid, and outlet. A mixing zone is disposed within the flow passage between the intake and the outlet. There is a means for introducing a hot compressible driving fluid into the mixing zone, whereby interaction between the driving fluid and the working fluid in the mixing zone develops a pressure reduction in the mixing zone to cause working fluid to be drawn from said source into the mixing zone and propelled towards the outlet. And there is a means for aerating the working fluid with an aerating gas prior to interaction of the driving fluid in the mixing zone whereby a three-phase fluid regime is created in the mixing zone by virtue of the interaction of the aerating gas, the working fluid and the driving fluid.

The interaction between the hot compressible driving fluid and the working fluid involves contact of driving fluid with the working fluid causing rapid cooling of the driving fluid to produce the pressure reduction in the mixing chamber. The rapid pressure reduction is in effect an implosion within the mixing zone. The feature of the driving fluid being compressible allows for a volumetric change upon rapid cooling of the driving fluid.

The interaction between the hot compressible driving fluid and the working fluid preferably also involves momentum transfer from the driving fluid to the working fluid.

Steam is a particularly suitable driving fluid, as it can be generated readily and efficiently. Furthermore, steam can be expanded easily and is capable of rapid volume reduction upon condensation to generate the necessary implosion effect.

During operation of the propulsion system, the driving fluid may be projected or injected into the working fluid on a continual basis or on an intermittent basis such as in a pulsed fashion.

The aerating gas may comprise air or any other appropriate gas or gaseous mixture. Aeration of the working fluid produces a two-phase mixture which has some compressibility. It is believed that the aeration has the effect of lowering the density of the two-phase mixture in comparison to the working fluid, so assisting in the transfer of the working fluid along the flow passage towards the mixing chamber. The lower density of the two-phase mixture is also advantageous as the density is closer to the density of the driving fluid, so assisting momentum transfer. Momentum transfer is increased as the density of the two phase mixture approaches the density of the driving fluid.

U.S. Pat. No. 3,259,065 (Ross et al.) discloses a means for minimizing the drag and temperature rise at the nose or leading edge portions of supersonic vehicles. A virtual nose cone is provided by one or more jets of high velocity gas, protected ahead of the vehicle either on-axis or at a slight angle thereto depending on the particular angle of attack. The gas is expelled from a nozzle at supersonic velocity to form a jet or virtual spike.

This gas is expelled forward into the oncoming supersonic air stream until it terminates where a shock wave commences. Behind the shock wave, a conical subsonic boundary layer of trapped air and gas forms. The air flow around the vehicle is substantially identical to that which would have been produced by the conventional elongated nose cone. While the forward portion of this virtual spike does experience heating, no structural problem is introduced since the trapped air and gas is continually replaced.

In currently unpublished US patent application(s) and published articles Robert Daniel Hunt (Hunt Aviation, www.fuellessflight.com) discloses gliding airships and underwater craft involving cyclical buoyancy change for gliding up and down. This revolutionary invention can extract renewable thermal and gravitational potential energy from the atmosphere or water. In some embodiments of the airships the buoyancy control is at least partly dependent on exchange of heat with the ambient atmosphere. In particular, a phase change fluid or refrigerant can be heated and cooled through its boiling point to provide buoyancy control. For the purposes of the present invention such a cyclically gliding craft will be called a cyclider.

It is noted that the energy required for buoyancy control is partially independent of the gravitational potential energy released by the rise and fall of such a craft. In fact under certain conditions the energy released can far exceed the energy required and fuel-free flight powered by the renewable energy of the atmosphere can occur.

The present invention seeks to provide a motion generating system generating motion utilizing a pressure reduction resulting from heat transfer from a hot fluid introduced near an external surface of an object.

DISCLOSURE OF THE INVENTION

For purposes of terminology this invention can be referred to as an excuser system, by analogy with a person who runs through a crowd shouting "excuse me" to the people ahead.

According to one aspect of the present invention there is provided a motion generating system to control the relative motion of an object and a region of an adjacent fluid, comprising the object having a primary surface in continuous fluid communication with the adjacent fluid, a target zone disposed in the adjacent fluid and located relative to the primary surface, an implosion zone disposed in the adjacent fluid and located relative to the primary surface and any fluid present in the implosion zone is in close thermal and pressure contact with the primary surface, a means for introducing a hot fluid from the object into the target zone, a transfer path along which the hot fluid can transfer from the target zone to the implosion zone, and when the hot fluid enters the implosion zone heat exchange between the hot fluid, the primary surface, and the adjacent fluid in and around the implosion zone develops or maintains a dynamic pressure reduction in the implosion zone to cause regions of the adjacent fluid, the hot fluid, and the primary surface to be relatively propelled towards each other.

For the purposes of the present invention, a hot fluid is compressible and initially has a higher temperature than a corresponding primary surface.

According to another aspect of the present invention there is provided a motion generating system to control the relative motion of an object and a region of an adjacent fluid, comprising the object having a primary surface in continuous fluid communication with the adjacent fluid, a target zone disposed in the adjacent fluid and located relative to the primary surface, an implosion zone disposed in the adjacent fluid and located relative to the primary surface and any fluid present in the implosion zone is in close thermal and pressure contact with the primary surface, a means for introducing a chemically reactive material from the object into the target zone in conditions whereby said chemically reactive material undergoes a reaction in the target zone having a product which is a hot fluid, a transfer path along which the hot fluid can transfer from the target zone to the implosion zone, and when the hot fluid enters the implosion zone heat exchange between the hot fluid, the primary surface, and the adjacent fluid in and around the implosion zone, develops or maintains a dynamic pressure reduction in the implosion zone to cause regions of the adjacent fluid, the hot fluid, and the primary surface to be relatively propelled towards each other.

It is desirable that the hot fluid introduced to the target zone transfers momentum to adjacent fluid located in the target zone and transfers momentum to adjacent fluid entering the target zone impelling at least a portion of the adjacent fluid out of the target zone.

Motion of portions of the adjacent fluid relative to the primary surface is caused by initial expansion of the hot fluid accelerating adjacent fluid out of the target zone, entrainment of any adjacent fluid entering the transfer path with the motion of the hot fluid along the transfer path towards the implosion zone, and implosion of the hot fluid in the implosion zone accelerating adjacent fluid towards the implosion zone. Motion of portions of the adjacent fluid relative to the primary surface may also include motion of the object relative to any unaccelerated adjacent fluid where the motion of the object is caused by propulsion of the object by a pressure difference on the object resulting from a dynamic reduction in pressure on the primary surface due to the implosion of the hot fluid in the implosion zone.

A cooling system including a heat sink may also be provided in thermal contact with the primary surface in order to improve and maintain the heat transfer from the hot fluid to the primary surface.

The hot fluid may be steam or another gas or gas mixture capable of condensing to a liquid or solid at or above the temperature of the adjacent fluid, or the temperature of the cooled primary surface. A condensing phase change produces an implosion with a significant temporary reduction in pressure in and around the implosion zone.

When the adjacent fluid in communication with the primary surface is water or some other fluid with a low oxygen content, Brown's gas can be projected or injected into the target zone and ignited. The resulting steam expands explosively and cools, pushing some of the adjacent fluid away from the target zone. If the adjacent fluid and primary surface can absorb sufficient remaining heat, including the heat of condensation, the steam will rapidly condense to water. This implosion provides a significant temporary regional reduction of pressure.

When the adjacent fluid in communication with the primary surface is air or some other fluid with sufficient oxygen content, hydrogen gas can be projected or injected into the target zone and ignited. Brown's gas can also be projected or injected to provide higher explosive and implosive performance due to the reduced concentration of other gases such as nitrogen in the target zone. The resulting steam expands explosively and cools, pushing some of the adjacent fluid away from the target zone. If the adjacent fluid and primary surface can absorb sufficient remaining heat, including the heat of condensation, the steam will rapidly condense to water. This implosion provides a significant temporary regional reduction of pressure and a potential reduction of drag on the primary surface.

In a further aspect of the present invention there is provided a thrust surface on the object having an ambient fluid in pressure contact providing a force on the object which contributes to the propulsion of the object when the object has a degree of freedom of motion.

The controlled distance, in the direction of motion of the object, between the primary surface and the target zone is controlled via projection or injection rate, velocity, direction, and timing, in accordance with the motion of the object. The control may be optimised so that the primary surface of the object experiences the maximum reduction of pressure in order to maximise thrust.

There is potential to develop significant thrust. For example a five percent reduction of atmospheric pressure over a primary surface could provide 5 kN of force per square meter (about 1,100 lb wt/square m). Meanwhile the reduced atmospheric density reduces the drag on the object.

Introducing the hydrogen and/or Brown's gas into a target zone further from a primary surface can reduce the thrust of the explosion of hydrogen on a primary surface of the object. If a primary surface and hot fluid are in relative motion towards one another the target zone can be positioned further from the object without depleting the pressure reduction on the primary surface.

The object may be a craft for use on water, underwater, on land, and/or in the air.

Controlling the distribution of pressure on the external surfaces of a craft using the motion generating system of the present invention can influence the dynamics and attitude of the craft. In one embodiment of the present invention an injection probe is used to inject steam, hydrogen, and/or Brown's gas into the target zone. The injection probe is extendable and contractible, and can also be made capable of swiveling, and the outlet nozzle is a directional nozzle. The location and distribution of the target zone can be controlled relative to the primary surface. This affects the distribution of pressure on the primary surface and hence the dynamics and attitude of the craft.

The present invention includes a method of starting the formation of a plume of hot fluid reaching from a nozzle to a primary surface by contracting the injection probe so that the nozzle is moved to an initial position proximal to the primary surface; initiating flow of the hot fluid from the nozzle; increasing the extension of the injection probe to an intermediate extent; waiting for the flow of the plume of hot fluid towards the primary surface to become established and for thrust to arise; of increasing the extension of an injection probe at the front of a craft as the craft's speed increases, and decreasing the extension of the said injection probe as the craft's speed decreases. The amount of extension is ideally controlled to provide optimal expansion and cooling of the hot fluid at a time of contacting a primary surface of the craft.

In an embodiment of the present invention most of the hot fluid is directionally injected in the direction of the primary surface. This arrangement provides the opportunity to generate useful thrust from the adjacent fluid.

In an alternative embodiment of the present invention a craft has an injection probe fitted with a combustion chamber and a nozzle. Hydrogen and oxygen and/or hydrogen peroxide are combusted in the combustion chamber and the resulting superheated steam is directed by the nozzle in the manner of a rocket engine thereby developing thrust. The exhaust steam, or part thereof, is directed towards a primary surface in order to provide further thrust, drag reduction and/or lift. According to the present invention thrust surfaces may be heated in order to stop condensation of steam.

In another embodiment of the present invention a directed jet may be used to project pressurised steam, hydrogen, hydrogen peroxide, and/or Brown's gas into the target zone.

It should be noted that if hydrogen peroxide is used in any of the embodiments of the present invention then it is preferable that hydrogen also be used to ensure substantially complete combustion to form superheated steam substantially devoid of unburned contaminants.

In another embodiment of the present invention cryogenic pellets of hydrogen and/or Brown's gas may be projected into the target zone. The vaporisation in addition to the combustion of these pellets adds to the explosion and resulting clearance of adjacent fluid from the target zone.

Any means or combination of means capable of introducing a hot fluid and/or chemically reactive material into a target zone may be used in embodiments of the present invention.

In addition to the location of the target zone, the shape of the target zone may be controlled. For example the target zone in front of a craft may be longitudinally extended in order produce an explosion having a shock wave which travels mainly transversely. This is analogous to a phased array antenna for directional communications. A transverse shock wave will expel in transverse directions more fluid from the path of the craft and produce less impulsive force on the front of the craft. Thus drag can be reduced and thrust increased.

In another embodiment of the present invention most of the hot fluid is directionally injected in a direction transverse to the direction of the primary surface. Some further embodiments having this arrangement are described below.

In another embodiment of the present invention a craft has an injection system with a nozzle projecting the hot fluid with a predominantly perpendicular direction of motion to the direction of motion of the craft thereby thrusting ambient fluid out of the path of the craft and replacing said ambient fluid with an expanding region, plume, or cone of hot fluid trailing behind the nozzle. Momentum transfer to the craft from the hot fluid striking the front of the craft is reduced in the direction of motion as a result of the said substantially perpendicular direction of motion of the hot fluid. Momentum transfer to the craft from the hot fluid and in a direction perpendicular to the direction of motion of the craft can also be reduced by providing opposing nozzles in order to balance the thrust of the hot fluid on the nozzles perpendicular to the direction of motion of the craft.

In a further embodiment of the present invention a craft has an injection system with a nozzle projecting the hot fluid in a predominantly planar region in all directions perpendicular to the direction of motion of the craft thereby thrusting ambient fluid out of the path of the craft and replacing said ambient fluid with an expanding region, plume, or cone of hot fluid trailing behind the nozzle.

In a further embodiment of the present invention, hydrogen and oxygen are supplied separately and/or supplied already mixed together in a substantially stoichiometric ratio of 2:1 to a combustion chamber and ignited in the combustion chamber producing the hot fluid consisting of substantially pure superheated steam.

In another embodiment of the present invention hydrogen is supplied and hydrogen peroxide is catalytically dissociated to form superheated steam and oxygen which are then supplied and/or undissociated hydrogen peroxide is supplied and additional oxygen may also be supplied to the combustion chamber and ignited in the combustion chamber with all the supplied chemicals in a necessary stoichiometric ratio required to produce the hot fluid consisting of substantially pure superheated steam according to:

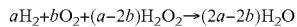

$$a\mathrm{H}_2 + b\mathrm{O}_2 + (a-2b)\mathrm{H}_2\mathrm{O}_2 \rightarrow (2a-2b)\mathrm{H}_2\mathrm{O}$$

where a and b are molar quantities.

The presence of unreacted fuel gases in the hot fluid reduces the degree of implosion because they do not condense at the same temperature and pressure as water vapour.

In another embodiment of the present invention a controlled flow of water and/or lower temperature steam is introduced into the superheated steam at selected locations ranging from the combustion chamber to the target zone and further to the implosion zone for influencing the dynamics and thermodynamics of the motion generating system.

Water and/or lower temperature steam may be introduced into the combustion chamber to cool the combustion, to cool and insulate the combustion chamber, and to increase the flow rate and velocity of superheated steam from the combustion chamber. Water and/or lower temperature steam may be introduced into the target zone to reduce the temperature, increase the density, or pressure, or modify the distribution of superheated steam in the target zone. Water and/or lower temperature steam may be introduced into the implosion zone to facilitate cooling and/or condensation of the superheated steam.

In another embodiment of the present invention, cryogenic oxygen and/or cryogenic hydrogen and/or cool hydrogen peroxide is passed as coolant fluids through the heat sink in thermal contact with the primary surface.

Static and dynamic lift can be generated in an embodiment of the present invention when the upper surface of a craft is a primary surface and the under side of the craft is a thrust surface. The target zone is spread widely across the primary surface. The primary surface is sloped downwards towards the edge of the craft in order to direct the propelled flow of adjacent fluid downwards and outwards. Dynamic or airfoil lift can also be generated by the flow of hot fluid and/or adjacent fluid if the primary surface is convex.

A further embodiment of the present invention may include thrust surface(s) which are maintained heated above a threshold temperature. This enables avoidance of condensation of the hot fluid on the thrust surface(s) and any consequent reduction of pressure on the thrust surface(s).

In particular, an exothermic reaction can be provided near the external side of the thrust surface(s) so as to provide heat and/or exert pressure on the thrust surface(s). This exothermic reaction may involve the oxidation of hydrogen.

The primary surface may be an efficient heat sink in order to stay cool while absorbing heat from the hot fluid. The primary surface can consist of a good thermal conductor such as aluminium for example, and may have a fluted surface to maximise surface area. Preferably the flutes are orientated parallel to the flow paths of the fluids moving over the primary surface.

Some embodiments of cyclider craft in Robert Hunt's currently unpublished US patent applications mentioned earlier utilise phase change of fluids such as steam or ammonia to control buoyancy. For example, a cyclider can be constructed using ammonia as a lifting gas. When the cyclider reaches an altitude where the pressure and temperature are appropriate for ammonia gas to liquefy then heat exchange with the atmosphere is initiated. The liquefied ammonia is stored in a thermally insulated pressure vessel. Buoyancy is lost and the cyclider glides downwards and may generate significant energy from air turbines during the descent. This energy can be stored as hydrogen and oxygen by electrolysis of water.

When the cyclider is required to increase buoyancy by vaporisation of liquid ammonia, the vaporisation process can be used to cool a primary surface, as described in the present invention, of such a cyclider. The present invention can enable a cyclider to attain high velocities and accelerations in, the atmosphere or an ambient fluid.

The hydrogen and oxygen created by electrolysis in the cyclider may be used as the chemically reactive material reacted to form the hot fluid introduced into a target zone according to the present invention. This can provide high performance flight powered by renewable energy.

It is conceivable that such a cyclider craft could attain a high speed in the atmosphere as a result of the reduction of frontal drag, the thrust generated by pressure control, and the increasing buoyancy generated by a phase change fluid.

Other phase change fluids or solids can be used inside the craft to cool the primary surface.

Condensed water can be recovered from the primary surface. This may be useful for ballast and creation of new steam and/or hydrogen and oxygen.

The means of providing thrust and lift of the present invention can be used in conjunction with other means of providing thrust and lift such as wheels, tracks, linear motors, electromagnetic force fields, buoyancy, gravity, sails, airfoils, propellers, jets, and rockets.

BRIEF DESCRIPTION OF THE DRAWINGS

The invention will be better understood by reference to the following description of several specific embodiments thereof as shown in the accompanying drawings.

BEST MODE(S) FOR CARRYING OUT THE INVENTION

Figure 1:
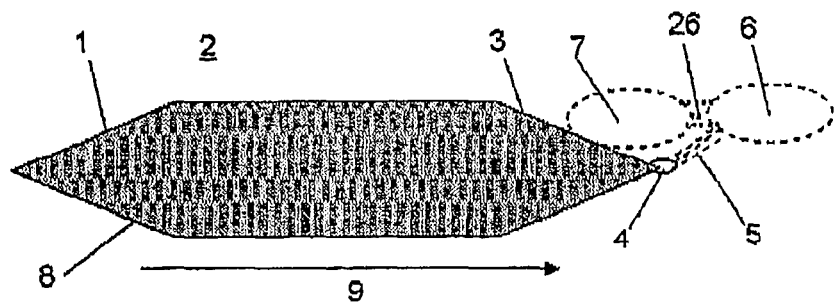
FIG. 1 is a schematic side view of a motion generating system according to a first embodiment utilising the introduction of hot fluid.

Referring now to FIG. 1 of the drawings there is shown a motion generating system according to a first embodiment utilising the introduction of hot fluid. The motion generating system according to a first embodiment comprises an object 1 at least partly immersed in an adjacent fluid 2, a primary surface 3 of the object 1, and a means for introducing a hot fluid 5 which in this embodiment is a projection system 4 projecting a hot fluid 5 from the object 1 into a target zone 6 in the adjacent fluid 2. The motion generating system controls the relative motion between the object 1 and a region of the adjacent fluid 2. A relative velocity of the object 1 with respect to a region of the adjacent fluid 2 is indicated by a relative velocity vector 9. In this first embodiment the primary surface 3 is in continuous fluid communication with the adjacent fluid 2, may be inward or outward facing, and is shown as an outward facing surface in FIG. 1. The target zone 6 is disposed in the adjacent fluid 2 and located relative to the primary surface 3. An implosion zone 7 is also disposed in the adjacent fluid 2 and located relative to the primary surface 3 and any fluid present in the implosion zone 7 is in close thermal and pressure contact with the primary surface 3. The projection system 4 is a means for introducing the hot fluid 5 into the target zone 6. A transfer path 26 also disposed in the adjacent fluid 2 is a path along which the hot fluid 5 can transfer from the target zone 6 to the implosion zone 7. When the hot fluid 5 enters the implosion zone 7 heat exchange between the hot fluid 5, the primary surface 3, and the adjacent fluid 2 in and around the implosion zone 6 develops a dynamic pressure reduction in the implosion zone 6 to cause regions of the adjacent fluid 2, the hot fluid 5, and the primary surface 3 to be relatively propelled towards each other as indicated by the relative velocity vector 9.

It is noted that the target zone 6, implosion zone 7 and transfer path 26 are merely spatial regions in which various physical states and fluids exist which do not necessarily have sharp boundaries.

The object 1 may be accelerated if it has a degree of freedom and has a thrust surface 8 in pressure contact with the adjacent fluid 2 or another source of pressure.

The hot fluid 5 is compressible and initially has a higher temperature than the corresponding primary surface 3. For example, the hot fluid 5 can be steam. The initial expansion of the hot fluid 5 in the target zone 6 may be substantially omni directional, whereas the contraction of the hot fluid 5 in the implosion zone 7 may become substantially unidirectional towards the primary surface 3 when the hot fluid 5 contacts the primary surface 3.

Figure 2:
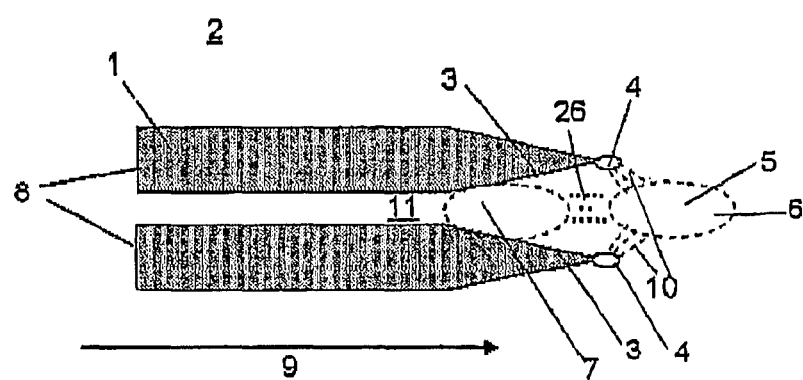
FIG. 2 is a cross-sectional side view of a motion generating system according to a second embodiment utilizing the introduction of hot fluid.

Referring now to FIG. 2 of the drawings there is shown a cross-sectional side view of a motion generating system according to a second embodiment utilizing the introduction of a chemically reactive material. The motion generating system according to the second embodiment comprises an object 1 at least partly immersed in an adjacent fluid 2, a primary surface 3 of the object 1, a means for introducing a chemically reactive material 10 which in this embodiment is an projection system 4 projecting a chemically reactive material 10 from the object 1 into a target zone 6. The motion generating system controls the relative motion between the object 1 and a region of the adjacent fluid 2. A relative velocity of the object 1 with respect to a region of the adjacent fluid 2 is indicated by a relative velocity vector 9. In this second embodiment the primary surface 3 is in continuous fluid communication with the adjacent fluid 2, may be inward or outward facing, and is shown as an inward facing surface of a duct 11 in FIG. 2. The target zone 6 is disposed in the adjacent fluid 2 and located relative to the primary surface 3. An implosion zone 7 is also disposed in the adjacent fluid 2 and any fluid present in the implosion zone 7 is in close thermal and pressure contact with the primary surface 3. The projection system 4 is a means for introducing the chemically reactive material 10 into the target zone 6, whereby said chemically reactive material 10 undergoes a reaction in the target zone having a product which is a hot fluid 5. A transfer path 26 also disposed in the adjacent fluid 2 is a path along which the hot fluid 5 can transfer from the target zone 6 to the implosion zone 7, and when the hot fluid 5 enters the implosion zone 7 heat exchange between the hot fluid 5, the primary surface 3, and the adjacent fluid 2 in and around the implosion zone 6 develops a dynamic pressure reduction in the implosion zone 6 to cause regions of the adjacent fluid 2, the hot fluid 5, and the primary surface 3 to be relatively propelled towards each other as indicated by the relative velocity vector 9.

It is desirable that the hot fluid 5 introduced to the target zone 6 transfers momentum to adjacent fluid 2 located in the target zone 6 and transfers momentum to adjacent fluid 2 entering the target zone 6 impelling at least a portion of the adjacent fluid 2 out of the target zone 6.

Motion of portions of the adjacent fluid 2 relative to the primary surface 3 is caused by initial expansion of the hot fluid 5 accelerating adjacent fluid 2 out of the target zone 6, entrainment of any adjacent fluid 2 entering the transfer path 26 with the motion of the hot fluid 5 along the transfer path 26 towards the implosion zone 7, and implosion of the hot fluid 5 in the implosion zone 7 accelerating adjacent fluid 2 towards the implosion zone 7. Motion of portions of the adjacent fluid 2 relative to the primary surface 3 may also include motion of the object 1 relative to any unaccelerated adjacent fluid 2 where the motion of the object 1 is caused by propulsion of the object 1 by a pressure difference on the object 1 resulting from a dynamic reduction in pressure on the primary surface 3 due to the implosion of the hot fluid 5 in the implosion zone 7.

Generally the hot fluid 5 and/or the chemically reactive material 10 may be injected or projected in a continuous stream or in a pulsed stream. Similarly the ignition of the chemically reactive material 10 may be continuous or pulsed.

Figure 3:
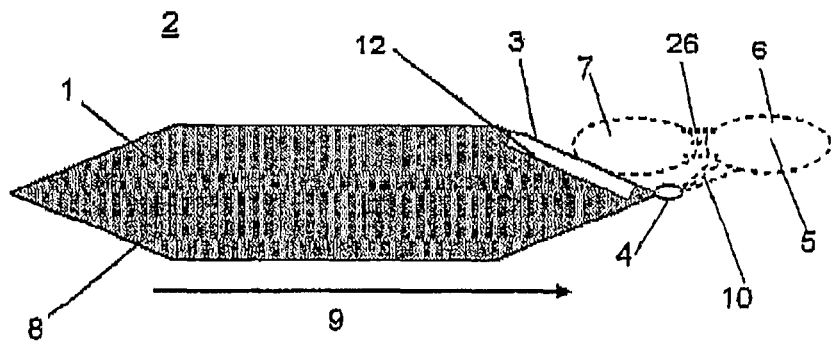
FIG. 3 is a cross-sectional side view of a motion generating system showing a heat sink.
Figure 4:
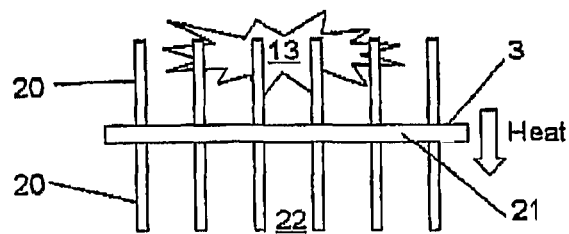
FIG. 4 is a cross-sectional view of a thermally conducting plate.

The primary surface 3 in all embodiments is preferably in thermal contact with an efficient heat sink 12 for removing excessive heat from the primary surface 3 as shown in FIG. 3. The requirement is that the primary surface 3 stays cool while absorbing heat from the hot fluid 5. The primary surface 3 can be the external side of a thermally conducting plate 21 made of aluminium for example, and may be a fluted surface 20 to maximise surface area in contact with the implosion zone 6 which undergoes a dynamic pressure reduction, or an implosion 13 as shown in FIG. 4. Preferably the flutes on the fluted surface 20 are orientated parallel to the flow paths of the fluids moving over the primary surface 3. FIG. 4 shows parts of a heat sink 12 including a fluted surface 20 on the internal side of the thermally conducting plate 21 which is in thermal contact with a coolant 22 that may be a phase change substance capable of absorbing a large quantity of heat.

The hot fluid 5 may be steam or another gas or gas mixture capable of condensing to a liquid or solid at the dynamic pressures occurring at the start of and during the condensation process and at or above the temperature of the adjacent fluid 2, or at or above the temperature of the cooled primary surface 3. A condensing phase change produces an implosion 13 with a significant dynamic pressure reduction in and around the target zone 6, as illustrated in FIG. 7.

Figure 5:
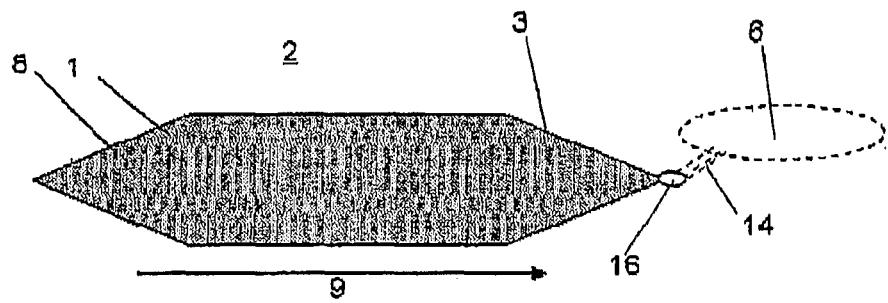
FIG. 5 is a schematic side view of a motion generating system according to a third embodiment and operating in water.
Figure 6:
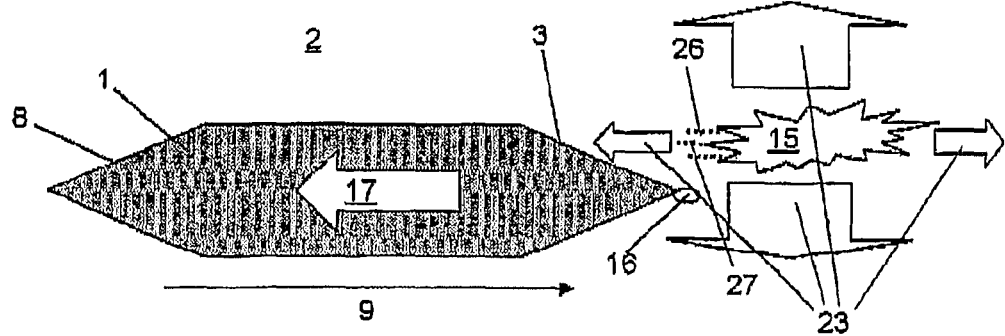
FIG. 6 is a schematic side view of a motion generating system of the third embodiment with a chemical reaction shown in an explosive state.
Figure 7:
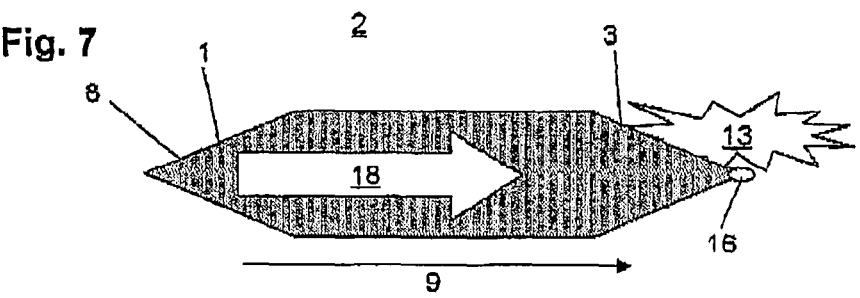
FIG. 7 is a schematic-side view of a motion generating system of the third embodiment and of the first embodiment with the hot fluid shown in an implosive state.
Figure 8:
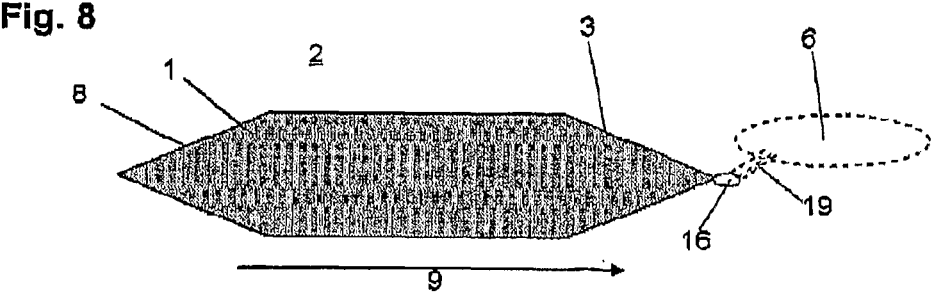
FIG. 8 is a schematic side view of a motion generating system according to a fourth embodiment and operating in air.
Figure 9:
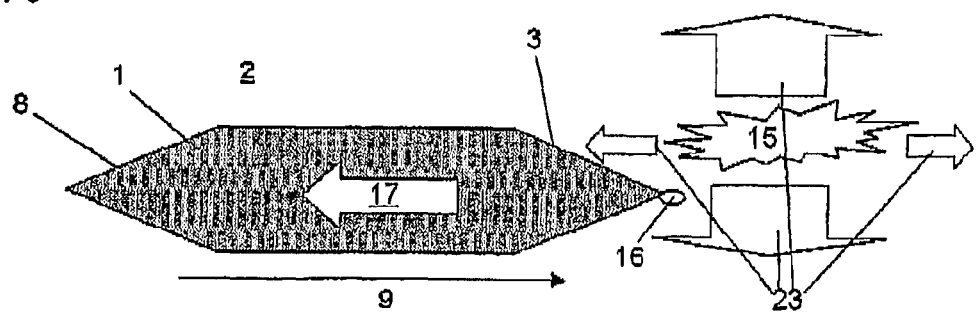
FIG. 9 is a schematic side view of a motion generating system of the fourth embodiment with a chemical reaction shown in an explosive state.
Figure 10:
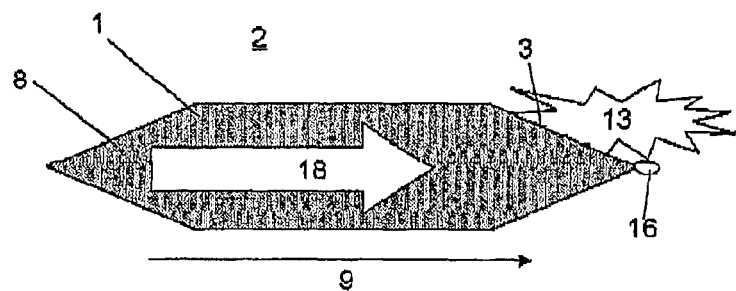
FIG. 10 is a schematic side view of a motion generating system of the fourth embodiment with a chemical reaction shown in an implosive state.

The chemically reactive material 10 may be reactive between its own constituent chemicals as in FIGS. 5 to 7, or with the adjacent fluid 2 as in FIGS. 8 to 10.

Referring now to FIGS. 5 to 7 of the drawings, there is shown a motion generating system according to a third embodiment. The third embodiment is similar to the second embodiment with the exception that the primary surface 3 is outward facing, and more specifically for example, the chemically reactive material is Brown's gas 14, and the adjacent fluid 2 is water.

FIG. 5 shows a pulse of Brown's gas 14 projected into the target zone 6 and ignited by the ignition and projection system 16. The adjacent fluid 2 in communication with the primary surface 3 is preferably water or some other fluid with low molecular oxygen content.

In FIG. 6, after ignition of the Brown's gas 14 the resulting steam explosion 15, which is hot fluid 5 comprised of steam 27, expands and cools, causing an ejection 23 of some of the adjacent fluid 2 away from the target zone 6. At this stage some reverse thrust 17 on the object 1 occurs as a result of the higher pressures on the primary surface 3 than on the thrust surface 8. The separation between the steam 27 and object 1 reduces as a result of the relative velocity 9, and the steam 27 passes through the transfer path 26 (or in other words the transfer path 26 passes over the steam 27).

In FIG. 7, the adjacent fluid 2 and primary surface 3 absorbs sufficient remaining heat, including the heat of condensation, and the hot fluid 5 comprised of steam rapidly condenses to water. This implosion 13 provides a significant temporary regional dynamic pressure reduction. At this stage forward thrust 18 on the object 1 occurs as a result of the different pressures on the primary surface 3 and the thrust surface 8. Assuming that the object 1 has an appropriate degree of freedom, the time averaged acceleration or deceleration of the object 1 depends on the net effect of the reverse thrust 17 and forward thrust 18.

Referring now to FIGS. 8 to 10 of the drawings, there is shown a motion generating system according to a fourth embodiment. The fourth embodiment is similar to the third embodiment with the exception that the chemically reactive material 10 is hydrogen gas 19 and the adjacent fluid 2 is air.

In FIG. 8, the adjacent fluid 2 in communication with the primary surface 3 is air or some other fluid with sufficient oxygen content. Hydrogen gas 19 is projected into the target zone 6 and ignited by the projection and ignition system 16. Brown's gas can also be projected to provide higher explosive and implosive performance due to the reduced concentration of other gases such as nitrogen in the target zone 6. Brown's gas does not have to mix with air to explode and therefore can form a region of steam with a reduced nitrogen concentration compared to the region of steam formed by a hydrogen explosion.

In FIG. 9 the resulting steam explosion 15 expands and cools, pushing some of the adjacent fluid 2 away from the target zone 6.

In FIG. 10 the adjacent fluid 2 and primary surface 3 absorbs sufficient remaining heat, including the heat of condensation, to rapidly condense the steam to water. This implosion 13 provides a significant temporary regional reduction of pressure on the primary surface 2, and a reduction of drag on the primary surface 2 when the object 1 is on a trajectory where the primary surface 2 moves through the implosion 13.

Figure 11:
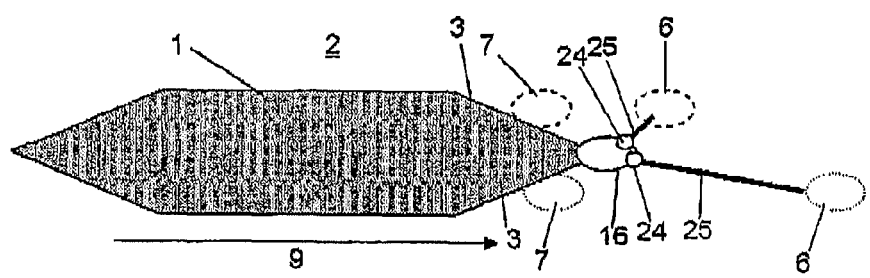
FIG. 11 is a schematic side view of a motion generating system according to a fifth embodiment which includes projecting hot fluid or chemically reactive material.

Referring now to FIG. 11 of the drawings, there is shown a motion generating system according to a fifth embodiment.

The fifth embodiment is similar to previous embodiments with the exception that the projection and ignition system 16 has a narrowly directed nozzle 24 for to projecting a jet 25 of hot fluid such as pressurised steam or a chemically reactive material such as hydrogen and/or Brown's gas into the target zone 6. When the target zone 6 is required to be more distant from the nozzle 24 the initial velocity of the jet 25 relative to the nozzle 24 is set higher. In the case wherein jet 25 includes a chemically reactive material 10, the reaction may be ignited either by the ignition and projection system 16 or by contact with the reaction occurring in or near the target zone 6. As the velocity of the object 1 relative to the adjacent fluid 2 indicated by relative velocity vector 9 increases, the target zone 6 can be repositioned further ahead of the object 1 in order to allow the eventual implosion to commence as the hot fluid from that repositioned target zone 6 reaches the primary surface 3 and the adjacent implosion zone 7. In FIG. 11 the fluid in each implosion zone 7 comes from the similarly bordered target zone 6. In contrast with the upper target zone 6, the lower target zone 6 is positioned appropriately for an increased relative velocity of the object 1 relative to the adjacent fluid 2. Generally, an implosion zone 7 must be maintained adjacent a primary surface 3 at any relative velocity 9 in order to obtain propulsion at that relative velocity 9.

Figure 12:
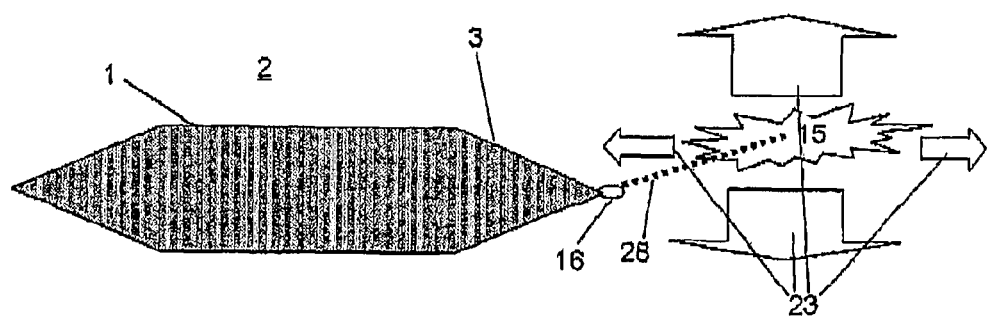
FIG. 12 is a schematic side view of a motion generating system according to a sixth embodiment which includes projecting cryogenic pellets of chemically reactive material.

In a sixth embodiment of the present invention shown in FIG. 12, cryogenic pellets 28 of hydrogen and/or Brown's gas may be projected into the target zone 6. In addition to the combustion, the vaporisation of the cryogenic pellets 28 adds to the steam explosion 15 and resulting clearance of adjacent fluid 2 from the target zone 6.

Figure 13:
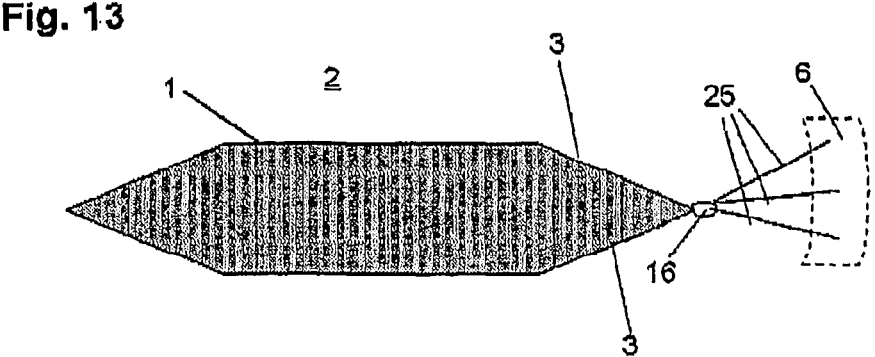
FIG. 13 is a schematic side view of a motion generating system according to a seventh embodiment which includes directional control of the projection of hot fluid or chemically reactive material.

In a seventh embodiment of the present invention shown in FIG. 13, the jet 25 of hot fluid, or chemically reactive material, may be directed forwards along the trajectory of the object, or at any angle to the trajectory. Control of direction of the target zone 6 controls the distribution of the subsequent implosion over the primary surfaces 3. This controls the distribution of pressure over the primary surfaces 3 and thereby controls the direction and magnitude of linear and angular thrust on the object 1.

Figure 14:
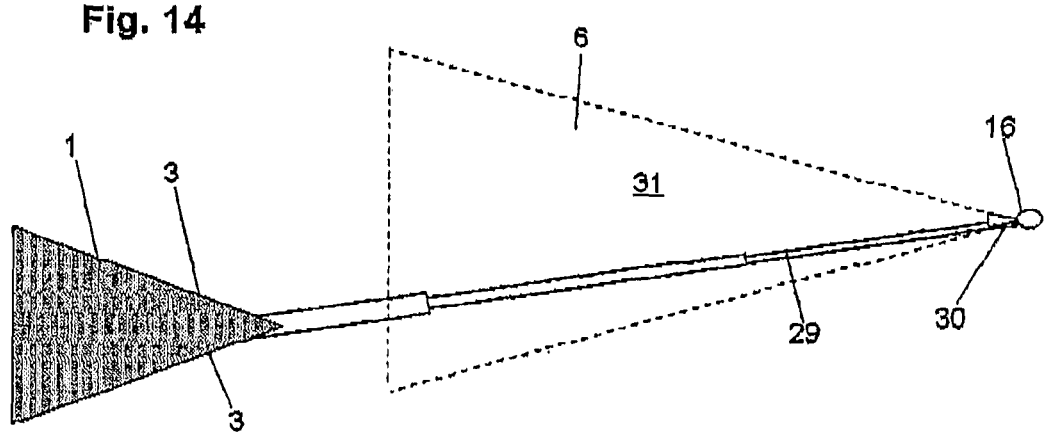
FIG. 14 is a schematic side view of a probe forming part of a motion generating system according to an eighth embodiment which includes an injection probe.

Referring now to FIG. 14 of the drawings, there is shown a motion generating system according to an eighth embodiment. The eighth embodiment is similar to the previous embodiment with the exception that an injection probe 29 is used to inject a jet or a plume 31 of hot fluid, and/or chemically reactive material, into the target zone 6. The injection probe 29 and a directional nozzle 30 can be provided with degrees of freedom. For example the injection probe 29 shown in FIG. 14 is extendable and contractible, capable of swiveling, and the directional nozzle 30 is also capable of swiveling. Through control of such degrees of freedom the location and distribution of the target zone 6 can be controlled relative to the primary surface 3. This affects the distribution of pressure on the primary surface 3 and hence the dynamics and trim of the object 1.

Figure 15:
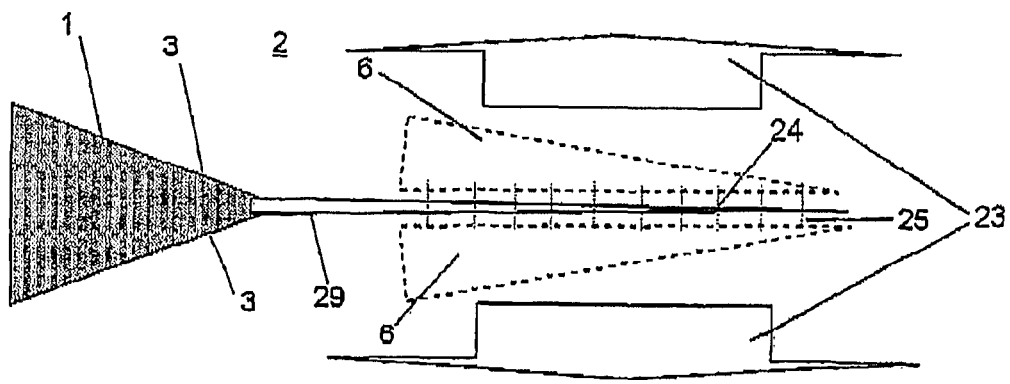
FIG. 15 is a schematic side view of a probe forming part of a motion generating system according to a ninth embodiment which includes a longitudinal target zone.

In a ninth embodiment of the present invention shown in FIG. 15, the shape of the target zone 6 is controlled by controlling an array of narrowly directed nozzles 24 positioned along a portion of the length of injection probe 29 providing the means of distribution of the hot fluid and/or chemically reactive material in jets 25. In this embodiment the target zone 6 in front of the object 1 is longitudinally extended in order produce an expansion and/or explosion having a shock wave which travels mainly transversely with respect to the trajectory. This is analogous to a phased array antenna for directional communications. A transverse shock wave creates more ejection 23 of adjacent fluid 2 from the path of the object 1 in transverse directions, and produces less impulsive force on the front of the craft. Thus drag can be reduced and thrust increased.

Figure 16:
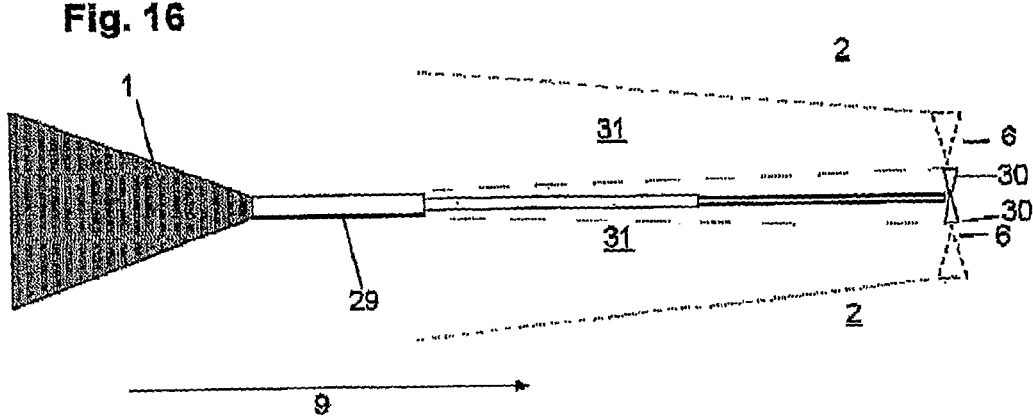
FIG. 16 is a schematic side view of a probe forming part of a motion generating system according to a tenth embodiment which includes transverse injection.

Referring now to FIG. 16 of the drawings, there is shown a motion generating system according to a preferred tenth embodiment. The tenth embodiment is similar to the previous embodiment with the exception that an object 1 has an injection probe 29 with a directional nozzle 30 projecting the hot fluid and/or chemically reactive material into a target zone 6 predominantly transversely to the direction of motion indicated by the relative velocity vector 9 of the object 1. In this case each target zone 6 has a conical shape. The projection in the transverse direction thrusts adjacent fluid 2 out of the path of the object 1 and replaces said adjacent fluid 2 with an expanding region, or plume 31 of hot fluid trailing behind each target zone 6.

Momentum transfer to the object 1 from the hot fluid and/or chemically reactive material from the hot fluid striking the front of the craft is reduced in the direction of motion as a result of the said substantially transverse direction of motion of the hot fluid and/or chemically reactive material. Momentum transfer to the object 1 from the hot fluid and/or chemically reactive material transverse to the direction of motion of the object 1 can also be reduced by providing opposing directional nozzles 30 in order to balance the thrust of the hot fluid and/or chemically reactive material on the directional nozzles 30 transverse to the direction of motion of the object 1.

Figure 17:
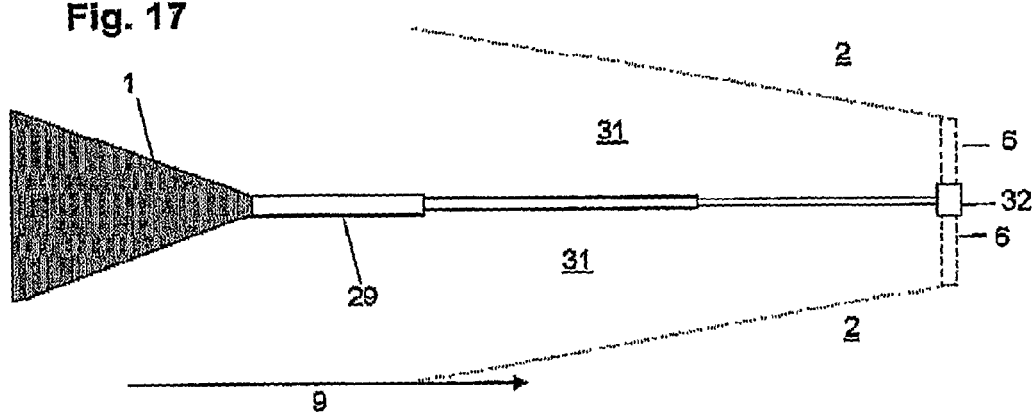
FIG. 17 is a schematic side view of a probe forming part of a motion generating system according to a eleventh embodiment which includes a transverse planar target zone.

In a preferred eleventh embodiment of the present invention shown in FIG. 17, an object 1 has an injection probe 29 with a planar nozzle 32 projecting the hot fluid and/or chemically reactive material into a target zone 6 having a predominantly planar shape orientated transversely to the direction of motion of the object 1. In this case the target zone 6 has an annular planar shape which is shown in cross-section in FIG. 17. Adjacent fluid 2 is thereby thrust out of the path of the object 1 and replaced with an expanding region, plume 31, or cone of hot fluid trailing behind the target zone 6.

Figure 18:
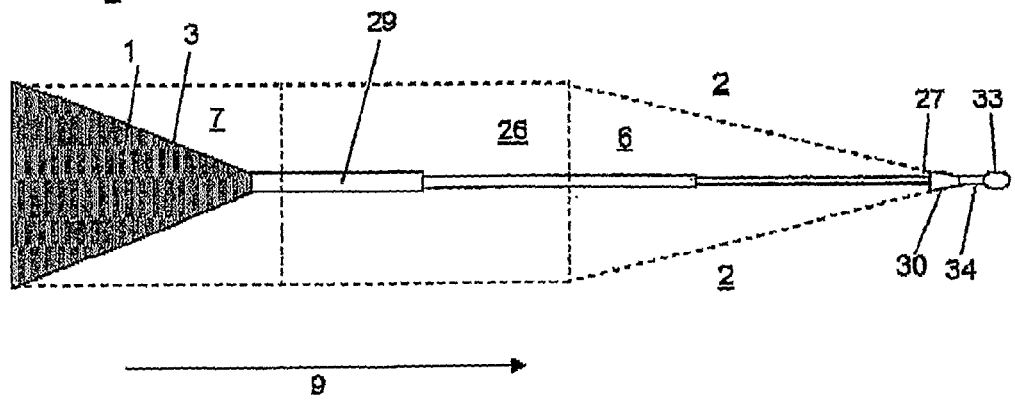
FIG. 18 is a schematic side view of a probe forming part of a motion generating system according to a twelfth embodiment which includes a combustion chamber.

Referring now to FIG. 18 of the drawings, there is shown a motion generating system according to a preferred twelfth embodiment. The twelfth embodiment is similar to the previous embodiment with the exception that an object 1 has an injection probe 29 fitted with a combustion chamber 33 and a directional nozzle 30. Hydrogen and oxygen and/or hydrogen peroxide are combusted in the combustion chamber 33 and the superheated exhaust steam 27 is transferred to and directed by the directional nozzle 30 in the manner of a rocket engine thereby developing thrust. The exhaust steam 27, or part thereof, is directed through a target zone 6, a transfer path 26, to an implosion zone 7 adjacent a primary surface 3 in order to provide further drag reduction and facilitate thrust, and/or lift on the object 1. The combustion chamber 33 may be located adjacent the directional nozzle 30, as shown in FIG. 18, or may be located elsewhere in the object 1. A transfer tube 34 transfers the hot fluid from the combustion chamber 33 to the directional nozzle 30.

It should be noted that the directional nozzle 30 in FIG. 16 and the planar nozzle in FIG. 17 may also be fed hot fluid 5 from a combustion chamber as described in reference to FIG. 18. The arrangement of the eleventh embodiment shown in FIG. 17 where the planar nozzle 32 is additionally fitted with a combustion chamber is considered to constitute one of the best modes for carrying out the invention.

In any embodiment of the present invention where a combustion chamber is used to provide the hot fluid consisting of superheated steam the combustion chamber is preferably supplied with hydrogen and a combination of oxygen, hydrogen peroxide, and water in a necessary stoichiometric ratio required to produce the hot fluid consisting of substantially pure superheated steam. The combustion chamber may also include a catalyst for the dissociation of hydrogen peroxide to oxygen and water. In addition a water/steam injection system (not shown in the figures) may be added to introduce a controlled flow of water and/or lower temperature steam into the superheated steam at selected locations ranging from the combustion chamber to the target zone and further to the implosion zone. Furthermore, cryogenic oxygen and/or cryogenic hydrogen and/or cool hydrogen peroxide may be passed as coolant fluids through the heat sink 12, referred to in FIG. 3, in thermal contact with the primary surface prior to supply of these chemicals to the combustion chamber.

Introducing the hydrogen and/or Brown's gas into a target zone further from a primary surface can reduce the thrust of the explosion of hydrogen on a primary surface of the object. If a primary surface and hot fluid are in relative motion towards one another the target zone can be positioned further from the object without depleting the pressure reduction on the primary surface. The controlled distance, in the direction of motion of the object, between the primary surface and the target zone 6 is controlled via injection rate, velocity, direction, and timing, in accordance with the motion of the object. The control may be optimised so that the primary surface of the object experiences the maximum reduction of pressure in order to maximise thrust.

Figure 19:
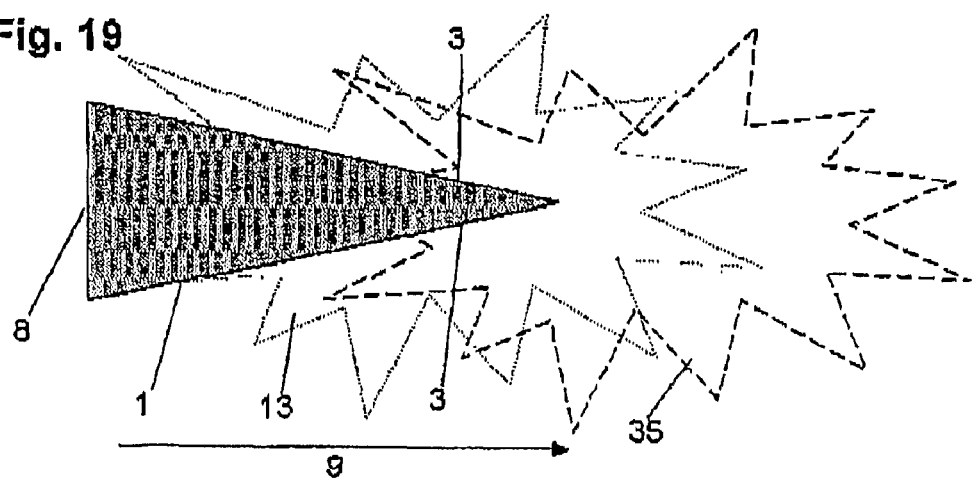
FIG. 19 is a schematic side view of part of a motion generating system with an injection and ignition system not shown.

FIG. 19 illustrates the case where the target zone 6 is positioned ahead of an object 1 in the trajectory of the object 1. The object 1 is moving in the direction indicated by relative velocity vector 9. The object 1 experiences a small reverse thrust from the more distal explosion 35 of chemically reactive material and/or expansion 35 of hot fluid. This is followed by a larger forward thrust resulting from the proximal implosion 13 of the hot fluid at the primary surface 3 and the ambient pressure on the thrust surface 8 of the object 1.

Figure 20:
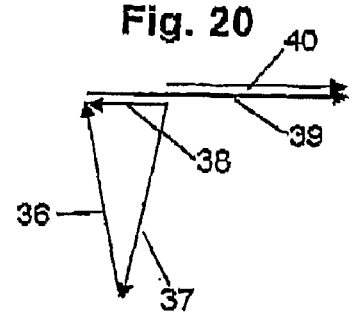
FIG. 20 is a vector diagram of forces illustrating the vector sum of thrust on the object shown in FIG. 19.

FIG. 20 is a vector diagram describing the thrust forces in the case of FIG. 19. The right explosion thrust vector 36 is the explosion's thrust on the right hand side primary surface 3, the left explosion thrust vector 37 is the explosion's thrust on the left hand side primary surface 3, the resultant explosion thrust vector 38 is the vector sum of these explosion thrust vectors. The implosion thrust vector 39 is the net thrust resulting from the implosive pressure reduction on the primary surfaces 3 and the ambient pressure on the thrust surface 8. The net thrust vector 40 is the vector sum of the resultant explosion thrust vector 8 and the implosion thrust vector 39. This analysis assumes the resultant explosion thrust vector 8 and the implosion thrust vector 39 act for equal time intervals, or alternatively that they represent the total impulses acting on the object 1 over the cycle of explosion and implosion.

In general, the case in which the object moves towards a static hot fluid and the case in which the hot fluid moves towards a static object are limiting cases. If the object has a degree of freedom usually there is a combination of both the object and the hot fluid moving towards each other. A flying object which is identified as hovering is an example of the case in which the hot fluid moves towards the static object in order to provide lift.

Figure 21:
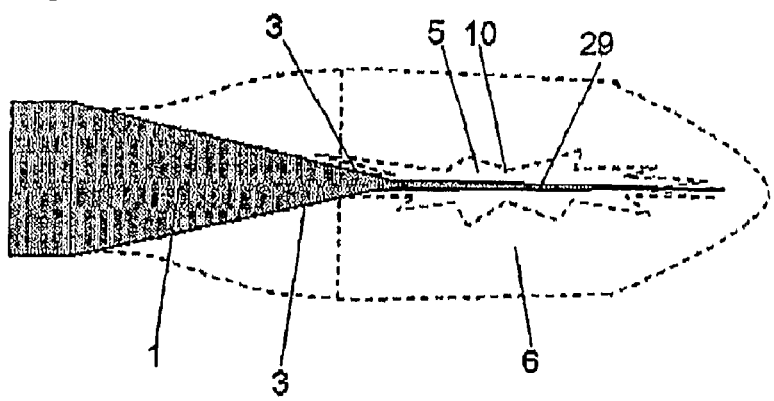
FIG. 21 is a schematic side view of a nose of an object and a probe forming part of a motion generating system according to a thirteenth embodiment with an initial position of the target zone.
Figure 22:
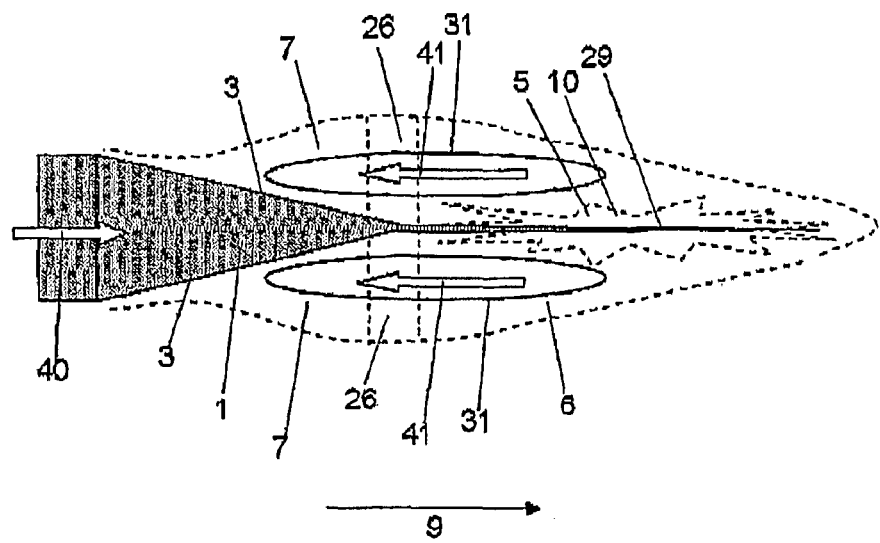
FIG. 22 is a schematic side view of a nose of an object and a probe forming part of a motion generating system according to a thirteenth embodiment with an intermediate position of the target zone.
Figure 23:
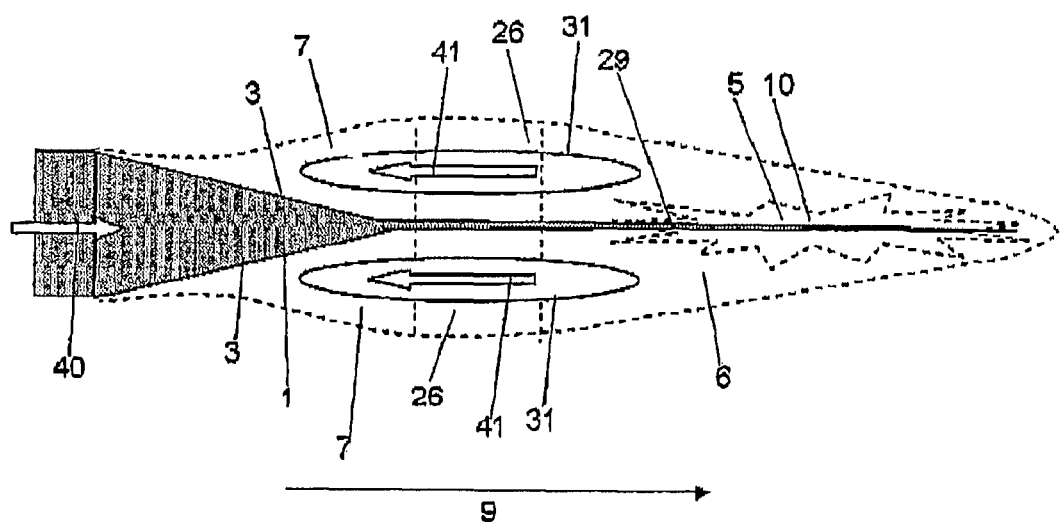
FIG. 23 is a schematic side view of a nose of an object and a probe of a motion generating system according to a thirteenth embodiment with an extended position of the target zone.

Referring now to FIGS. 21, 22, and 23 of the drawings, there is shown a motion generating system according to a thirteenth embodiment which is similar to the ninth embodiment shown in FIG. 15 with the exception that the injection probe 29 is extendible.

The present invention includes a method, described with reference to FIGS. 21, 22, and 23, of controlling the relative motion of an object 1 and region of an adjacent fluid 2 comprising the steps of providing an object 1 having a primary surface 3 and a means of introducing a hot fluid 5 and/or chemically reactive material 10 into a target zone 6 in the adjacent fluid 2;

moving the target zone 6 to an initial position, shown in FIG. 21, proximal to the primary surface 3;

initiating flow of the hot fluid 5 and/or a chemically reactive material 10 from a means of introducing the hot fluid 5 and/or chemically reactive material 10, which means is the injection probe 29 in this embodiment, to the target zone 6;

igniting the chemically reactive material 10 if the chemically reactive material 10 is present in the target zone 6;

moving the target zone 6 to an intermediate position, shown in FIG. 22, more distal from the primary surface 3 in a manner which maintains continuity of a plume 31 of hot fluid 5;

waiting for the establishment of the flow of the plume 31, indicated by plume flow vector 41, of hot fluid 5 from the target zone 6, through a transfer path 26, and into an implosion zone 7 in contact with the primary surface 3;

increasing the distance of the target zone 6 from the primary surface 3, as shown in FIG. 23, in a manner which maintains flow of the plume 31, indicated by plume flow vector 41, as the relative velocity 9 between the object 1 and the hot fluid 5 increases;

and further comprising the step of decreasing the distance of the target zone 6 from the primary surface 3, as shown in FIG. 22, in a manner which maintains flow of the plume 31 as the relative velocity 9 between the object 1 and the hot fluid 5 decreases.

The distance of the target zone 6 from the primary surface 3 is ideally controlled to provide an optimal combination of expansion and cooling of the hot fluid 5 by the time the hot fluid 5 contacts the primary surface 3 of the object 1.

In FIGS. 22 and 23 the plume flow vector 41 and the net thrust vector 40 are represented by arrows. In FIG. 21 while flow of the hot fluid 5 and/or the chemically reactive material 10 has commenced, the plume and thrust have not yet developed and there is effectively zero net relative velocity between the object 1 and the hot fluid 5.

Figure 24:
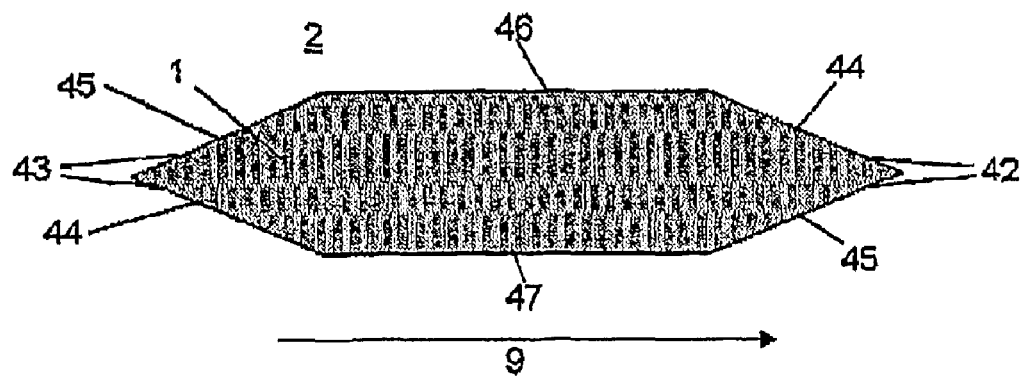
FIG. 24 is a schematic right-side view of a motion generating system according to a fourteenth embodiment indicating zones for placement of motion generating systems to control particular motions.
Figure 25:
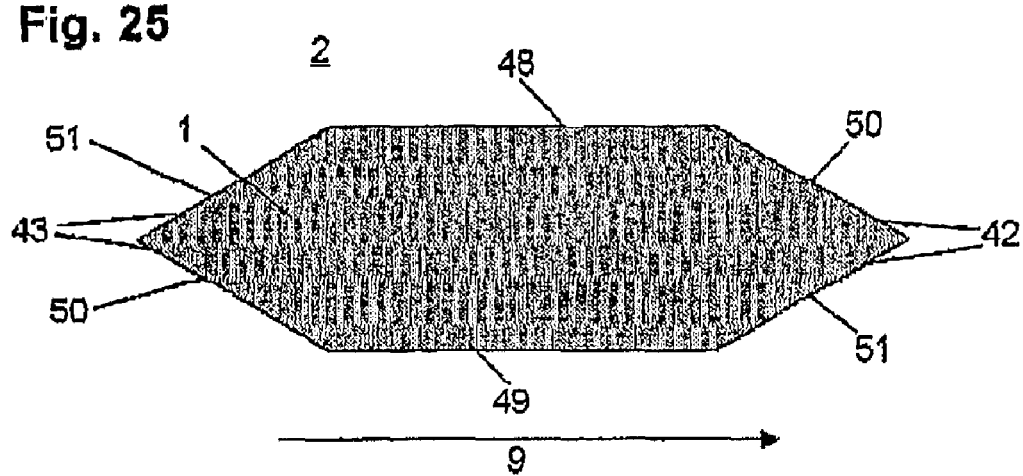
FIG. 25 is a schematic plan view of a motion generating system according to a fourteenth embodiment indicating zones for placement of motion generating systems to control particular motions.
Figure 26:
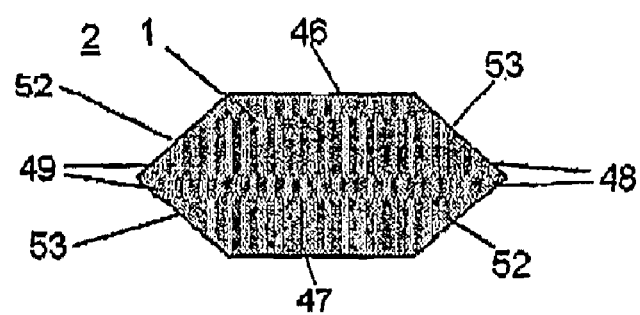
FIG. 26 is a schematic front view of a motion generating system according to a fourteenth embodiment indicating zones for placement of motion generating systems to control particular motions.

Referring now to FIGS. 24, 25, and 26 of the drawings, there are shown locations of primary surfaces of a motion generating system according to a fourteenth embodiment. In this embodiment the three dimensional dynamics and attitude of the object 1 in the adjacent fluid 2 can be influenced by controlling the distribution of pressure on the primary surfaces of the object 1 using the motion generating system of the present invention.

In FIG. 24 a right-side view of the object 1 is shown. According to the present invention a dynamic pressure reduction is produced at a primary surface and when the primary surface is: an acceleration and drag reduction zone 42 located at the front of the object 1 then the object 1 will experience and an acceleration force and a reduced drag force; a deceleration zone 43 located at the rear of the object 1 then the object 1 will experience a deceleration force; a positive pitch zone 44 located on the upper front and/or the lower rear of the object 1 then the object 1 will experience a positive pitch force; a negative pitch zone 45 located on the lower front and/or the upper rear of the object 1 then the object 1 will experience a negative pitch force; a lift zone 46 located at the top of the object 1 then the object 1 will experience a lift force; a sink zone 47 located at the bottom of the object 1 then the object 1 will experience a sink force.

In FIG. 25 a plan view of the object 1 is shown. When the primary surface is: port zone 48 located at the port side of the object 1 then the object 1 will experience a side-slip force towards port; a starboard zone 49 located at the starboard side of the object 1 then the object 1 will experience a side-slip force towards starboard; a port yaw zone 50 located on the front port side and/or the rear starboard side of the object 1 then the object 1 will experience a port yaw force; a starboard yaw zone 51 located on the front starboard side and/or the rear port side of the object 1 then the object 1 will experience a starboard yaw force. An acceleration and drag reduction zone 42, and a deceleration zone 43, as described with reference to FIG. 24, is also shown in FIG. 25.

In FIG. 26 a front view of the object 1 is shown. When the primary surface is: a port-roll zone 52 located on the upper starboard side and/or the lower port side of the object 1 then the object 1 will experience a port-roll force; a starboard-roll zone 53 located on the lower starboard side and/or the upper port side of the object 1 then the object 1 will experience a starboard yaw force. A lift zone 46 and a sink zone 47, as described with reference to FIG. 24, are also shown in FIG. 26. A port zone 48 and a starboard zone 49, as described with reference to FIG. 25, are also shown in FIG. 26.

The motion generating system according to the present invention may include thrust surface(s) which are maintained heated above a threshold temperature. This enables avoidance of condensation of the hot fluid on the thrust surface(s) and any consequent reduction of pressure on the thrust surface(s).

In particular, an exothermic reaction can be provided near the external side of the thrust surface(s) so as to provide heat and/or exert pressure on the thrust surface(s). This exothermic reaction can involve the oxidation of hydrogen.

Figure 27:
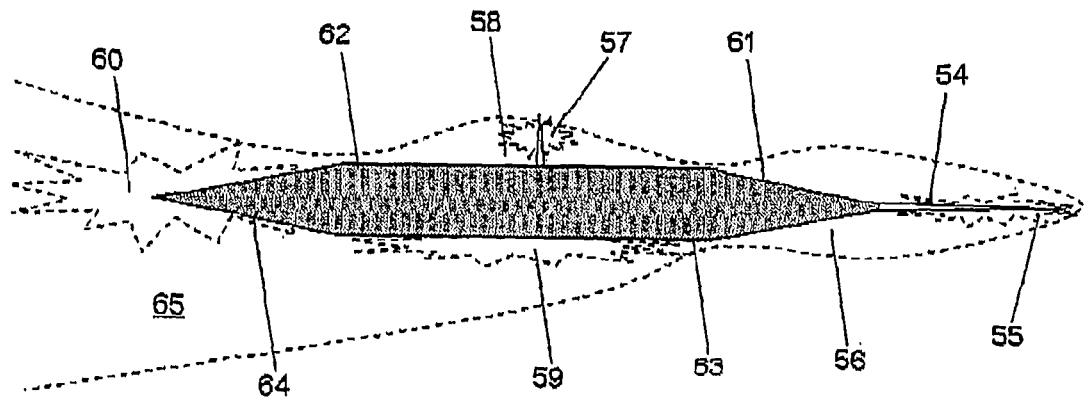
FIG. 27 is a side view of a flying object having a motion generating system according to a fifteenth embodiment including heated thrust surfaces.

In FIG. 27 there is a fifteenth embodiment having heated thrust surfaces. A side view of a flying object 1 is shown including an injection/ignition probe 54 projecting frontally, and providing for a continuous frontal explosion 55 which is trailed by a continuous frontal implosion 56 around a frontal cool surface 61 at the nose allowing the flying object 1 to continuously fly into a partial vacuum. A continuous top explosion 57 and associated continuous top implosion 58 above a top cooled surface 62 continuously provide a lower pressure lift zone on the upper surface of the flying object 1. A continuous bottom explosion 59 under a bottom hot surface 63 on the underside continuously provides additional upward thrust greater than the thrust otherwise provided by ambient pressure on the flying object 1. A continuous rear explosion 60 around a rear hot surface 64 at the tail continuously provides additional forward thrust greater than the thrust otherwise provided by ambient pressure thrust on the flying object 1. When all the explosions are created by oxidation of hydrogen a steam plume 65 trails the flying object 1.

Figure 28:
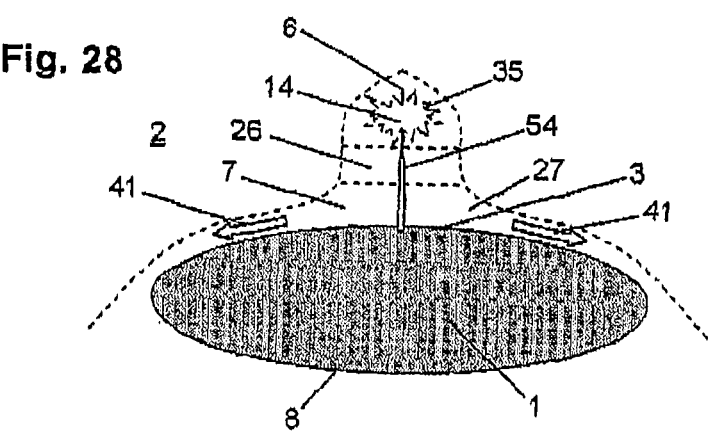
FIG. 28 is a schematic side view of a motion generating system according to a sixteenth embodiment utilizing dynamic lift.

Referring now to FIG. 28 of the drawings, there is shown a motion generating system according to a sixteenth embodiment. In this embodiment static and dynamic lift can be generated when the upper surface of an object 1 is a primary surface 3 and the underside of the object 1 is a thrust surface 8. The target zone 6 is positioned above the primary surface 3 and in this embodiment Brown's gas 14 is injected from an injection/ignition probe 54. In this embodiment an explosion 35 in the target zone 6 produces steam 27 which flows through the target zone 6, a transfer path 26, to an implosion zone 7 adjacent the primary surface 3 in order to facilitate lift on the object 1. This is static lift in the sense that it depends on the difference between pressures on the primary surface 3 and the thrust surface 8. The primary surface 3 is sloped downwards towards the edge of the object 1 in order to direct the flow of adjacent fluid 2 mixed with any remaining steam 27 downwards and outwards as indicated by the plume flow vector 41. Dynamic or airfoil lift can also be generated by the flow of hot fluid 5 and/or adjacent fluid 2 if the primary surface 3 is convex, where this dynamic lift is generated in a similar manner to that generated by the curved upper side of a wing.

Figure 29:
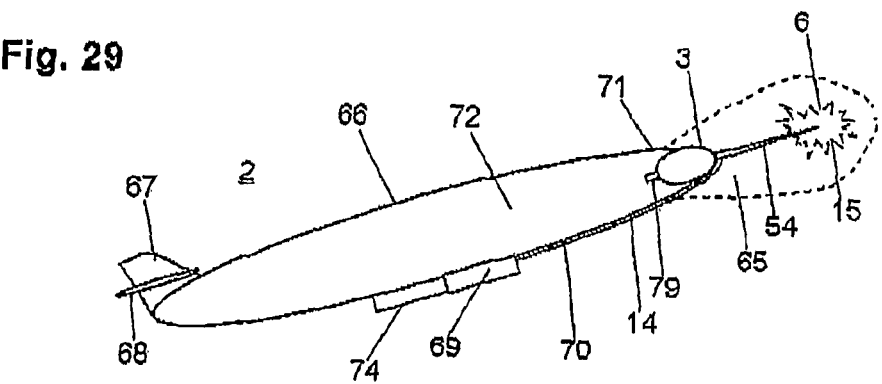
FIG. 29 is a longitudinal cross-sectional side view of a motion generating system according to a seventeenth embodiment where the object is an excuser cyclider.

An embodiment of the present invention is shown in FIG. 29 wherein the apparatus of the present invention is installed in a cyclider aircraft described in Robert Hunt's currently unpublished US patents mentioned earlier. The embodiment shown in FIG. 29 shows in longitudinal cross-section an excuser cyclider 72 comprising an expansible airship gas envelope 66, capable of variable volume, enclosing ammonia 73 functioning as a lifting gas and as a phase change fluid to control buoyancy of the excuser cyclider 72, a rudder 67 and a tail plane 68 for directional control and stability of the excuser cyclider 72, a water tank 74, an air driven turbine generator and electrolysis system 69 for electrolysis of water from the water tank 74 to provide Brown's gas 14, a tube 70 conveying the Brown's gas 14, an injection/ignition probe 54 to receive and inject Brown's gas 14 in front of the excuser cyclider 72 in order to create a steam explosion 15 resulting in a steam plume 65, a primary surface 3 on the nose of the excuser cyclider 72, an adjacent ammonia tank 71 receiving heat conducted from the primary surface 3, and a valve 79 for controlling flow of ammonia gas between the expansible airship gas envelope 66 and the ammonia tank 71.

When the excuser cyclider 72 is required to increase buoyancy by vaporisation of liquid ammonia 73, the vaporisation process can be used to cool a primary surface 3 of such a cyclider. The present invention can enable a cyclider to attain high velocities and accelerations in the atmosphere or an ambient fluid.

A cyclider may be designed to operate in adjacent fluids other than air, may use lifting materials other than ammonia, and may use phase change substances other than ammonia. For example a cyclider can use hot steam as a lifting fluid and methanol as a phase change substance. As an example of a natural cyclider, a sperm whale uses water as the adjacent fluid, flesh as the lifting materials, and spermaceti as the temperature dependent density fluid to control buoyancy. It should be noted that while temperature usually decreases with altitude in the atmosphere, temperature usually increases with altitude in the ocean. As a result fuel free cyclical gliding is simpler for phase change cycliders operating in the atmosphere.

Figure 30:
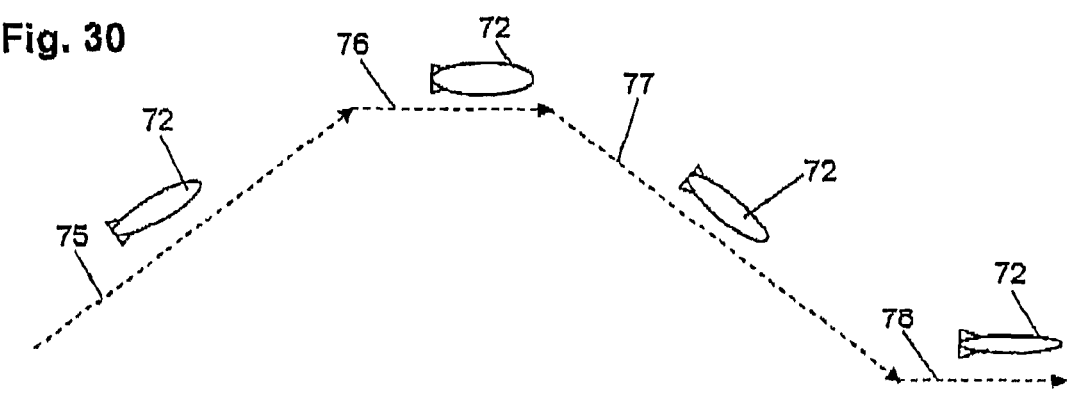
FIG. 30 is an elevation view of a flight path of the motion generating system according to the seventeenth embodiment shown in FIG. 29.

The present invention includes a method, described with reference to the elevation view of a flight path shown in FIG. 30, of controlling the relative motion of an object in an adjacent fluid 2 comprising the steps of providing the object comprising an excuser cyclider 72 described with reference to FIG. 29 immersed in the adjacent fluid 2 according to the seventeenth embodiment;

of controlling the excuser cyclider 72 to ascend 75 in either an oblique glide or vertically;

of simultaneously controlling the gross density of the excuser cyclider 72 to remain lower than the density of the ambient adjacent fluid 2 during the ascent 75;

of optionally, simultaneously increasing the buoyancy by releasing gaseous ammonia 73 from an ammonia tank 71;

of simultaneously operating a turbine generator and electrolysis system 69 driven by the adjacent fluid 2 to convert water from the water tank 74 into Brown's gas 14;

of simultaneously projecting or injecting and/or igniting the Brown's gas 14 and/or projecting or injecting the resulting steam into a target zone 6 in the adjacent fluid 2;

of simultaneously controlling conduction of heat from a primary surface 3 to the ammonia tank 71 to maintain condensation of the steam plume 65 and evaporation of ammonia 73;

of optionally simultaneously recovering the condensed water from the primary surface 3 and returning it to the water tank 74;

of controlling the excuser cyclider 72 to maintain higher altitudes 76 where the pressure and temperature are appropriate for ammonia 73 gas to liquefy;

of simultaneously controlling heat transfer from the ammonia tank 71 to the adjacent fluid 2;

of simultaneously controlling gaseous ammonia 73 to enter the ammonia tank 71 and liquefy;

of controlling the excuser cyclider 72 to descend 77 in either an oblique glide or vertically;

of simultaneously controlling the gross density of the excuser cyclider 72 to remain higher than the density of the ambient adjacent fluid 2 during the descent;

of simultaneously retaining liquefied ammonia 73 in the ammonia tank 71;

of optionally simultaneously thermally insulating the ammonia tank 71;

of simultaneously operating a turbine generator and electrolysis system 69 driven by the adjacent fluid 2 to convert water from the water tank 74 into Brown's gas 14 and storing the Brown's gas 14;

of controlling the excuser cyclider 72 to maintain lower altitudes 78 where the pressure and temperature are appropriate for liquid ammonia 73 to boil;

of optionally simultaneously controlling the gross density of the excuser cyclider 72 to remain equal to the density of the ambient adjacent fluid 2 in order to hover the excuser cyclider 72;

of optionally simultaneously controlling heat transfer from the adjacent fluid 2 to the ammonia tank 71;

and of repeating the steps in a cycle in order to further translate the excuser cyclider 72 horizontally with net thrust and low resistance from the adjacent fluid 2, or to further convert gravitational and thermodynamic energy for other purposes.

The hydrogen and oxygen created by electrolysis in the cyclider may be used as the chemically reactive material to react to form the hot fluid introduced into a target zone according to the present invention. This can provide high performance flight powered by renewable energy.

It is conceivable that such a cyclider craft could attain a high speed in the atmosphere as a result of the reduction of frontal drag, the thrust generated by pressure control, and the increasing buoyancy generated by a phase change fluid.

Other phase change fluids or solids can be used inside the craft to cool the primary surface.

Condensed water can be recovered from the primary surface. This may be useful for ballast and creation of new steam and/or hydrogen and oxygen.

Figure 31:
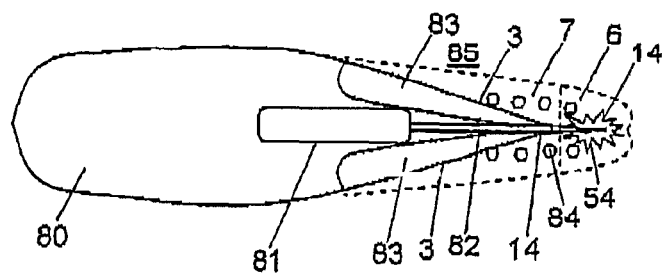
FIG. 31 is a plan cross-sectional view of a boat having a motion generating system according to an eighteenth embodiment.

An eighteenth embodiment of the present invention is described with reference to FIG. 31 wherein a plan view of a boat comprises a boat hull 80, a Brown's gas generator 81 inside the hull, an combustion probe 54 positioned under water on the bow pointing forward, a gas transfer tube 82 for transferring Brown's gas 14 from the Brown's gas generator 81 to the combustion probe 54, a primary surface 3 under water on each side of the bow, and a cooling system 83 inside the hull adjacent each primary surface 3.

The exploding Brown's gas 14 in the combustion/injection probe 54 results in injection of steam bubbles 84 in the target zone 6, and a plume 31 of steam bubbles 84 trailing from the target zone 6 to the implosion zone 7 where the steam bubbles 84 implode as a result of condensation of the steam on the cooled primary surface 3 and surrounding water 85. The boat hull 80 is thrust forward towards the implosion zone 7 and experiences reduced resistance to this forward motion due to the reduced mass of water at the bow.

Any means or combination of means capable of introducing a hot fluid and/or a chemically reactive material into a target zone may be used in embodiments of the present invention.

The means of providing thrust and lift of the present invention can be used in conjunction with other means of providing thrust and lift such as wheels, tracks, linear motors, electromagnetic force fields, buoyancy, gravity, sails, airfoils, propellers, jets, and rockets.

The shapes of the object 1, target zone 6, and other parts of the invention shown in the figures are merely illustrative and any other shapes may be used which fall within the scope of the appended claims.

While the invention has been described with reference to particular embodiments, it should be understood that the embodiments are merely illustrative as there are numerous variations and modifications that may be made by those skilled in the art. Thus, the invention is to be construed as being limited only by the spirit and scope of the appended claims.

The claims defining the invention are as follows:

1. A motion generating system to produce a relative thermodynamic force between an object and a region of adjacent fluid comprising:

a primary surface located on the object and in contact with part of the region of adjacent fluid, an implosion zone positioned adjacent the primary surface in the adjacent fluid, wherein adjacent fluid flows over the primary surface according to the relative motion between the object and the region of adjacent fluid, a target zone positioned in the region of adjacent fluid and upstream in the flow transfer path of the adjacent fluid that flows over the primary surface, a means for introducing fluid, where the means for introducing fluid is located on the object, a working fluid in a gaseous state which is hotter than the region of adjacent fluid and the primary surface, and the working fluid is introduced by the means for introducing fluid, from the object into the target zone, wherein the working fluid is introduced with momentum in a direction substantially perpendicular to the direction of the flow path of the adjacent fluid through the target zone, thereby ejecting and displacing a portion of the adjacent fluid laterally from the flow path, and a portion of the introduced working fluid is entrained in the flow and moves from the target zone with any un-ejected adjacent fluid, along the flow transfer path into the implosion zone, and, when the working fluid enters the implosion zone, heat exchange between the working fluid, the primary surface, and the adjacent fluid in and around the implosion zone, causes a condensing phase change in at least 20% of the working fluid which enters the implosion zone, producing an implosion process with a dynamic pressure reduction in the implosion zone, and the working fluid is a gas at least 20% of which is capable of condensing at the dynamic pressures and temperatures occurring in the implosion zone at the start of and during the implosion process, whereby the dynamic pressure reduction in the implosion zone produces a relative thermodynamic force between the object and a region of adjacent fluid causing reduced drag, increased lift, acceleration, and propulsion in the relative motion, between the object and the adjacent fluid.

2. A motion generating system to produce a relative thermodynamic force between an object and a region of adjacent fluid comprising:
a primary surface located on the object and in contact with part of the region of adjacent fluid,
an implosion zone positioned adjacent the primary surface in the adjacent fluid,
wherein adjacent fluid flows over the primary surface according to the relative motion between the object and the region of adjacent fluid,
a target zone positioned in the region of adjacent fluid and upstream in the flow transfer path of the adjacent fluid that flows over the primary surface,
a means for introducing fluid, where the means for introducing fluid is located on the object,
a working fluid in a gaseous state which is hotter than the region of adjacent fluid and the primary surface,
and the working fluid is introduced by the means for introducing fluid, from the object into the target zone, wherein the working fluid is introduced with momentum in a direction substantially perpendicular to the direction of the flow path of the adjacent fluid through the target zone, thereby ejecting and displacing a portion of the adjacent fluid laterally from the flow path,
and a portion of the introduced working fluid is entrained in the flow and moves from the target zone with any un-ejected adjacent fluid, along the flow transfer path into the implosion zone,
and, when the working fluid enters the implosion zone, heat exchange between the working fluid, the primary surface, and the adjacent fluid in and around the implosion zone, causes a condensing phase change in at least 20% of the working fluid which enters the implosion zone, producing an implosion process with a dynamic pressure reduction in the implosion zone,
and the working fluid is a gas at least 20% of which is capable of condensing at the dynamic pressures and temperatures occurring in the implosion zone at the start of and during the implosion process,
in which at least 20% of the working fluid is water vapor, whereby the dynamic pressure reduction in the implosion zone produces a relative thermodynamic force between the object and a region of adjacent fluid causing reduced drag, increased lift, acceleration, and propulsion in the relative motion,
between the object and the adjacent fluid.

3. The motion generating system according to claim 1 or 2, wherein the means for introducing fluid comprises:
a combustion chamber, wherein the working fluid is produced as a product of combustion,
a directional nozzle positioned and aligned to directionally introduce the working fluid into the target zone,
and a transfer means for transferring the hot fluid from the combustion chamber to the directional nozzle.

4. The motion generating system according to claim 3, further comprising a means of supply of the working fluid consisting of substantially pure superheated steam according to:

$$aH_2 + bO_2 + (a-2b)H_2O_2 \rightarrow (2a-2b)H_2O$$

for $a \geq 2b \geq 0$
where a and b are molar quantities.

5. The motion generating system according to claim 4, further comprising a means to introduce a controlled flow of cooler dihydrogen monoxide into the superheated steam for influencing the dynamics and thermodynamics of the motion generating system.

6. The motion generating system according to claim 1 or 2, wherein the primary surface is located in the frontal region of the object.

7. The motion generating system according to claim 1 or 2, wherein a plurality of primary surfaces are located on the object enabling control of translational and rotational motion of the object.

8. The motion generating system according to claim 1 or 2, wherein a primary surface is convexly curved in a direction of flow of the working fluid flowing parallel to and over the primary surface.

9. The motion generating system according to claim 1 or 2, wherein the object is formed in a shape that can glide in the adjacent fluid, and the object has a gross density variably controllable to both a lower density and to a higher density than the density of the adjacent fluid, and the primary surface is thermally connected inside the object to a phase change substance capable of an endothermic phase change to a lower density phase.

10. A method of controlling the motion of an object in an adjacent fluid comprising the steps of providing the object immersed in the adjacent fluid with an expansible envelope enclosing a lower density fluid phase of a phase change substance, a tank connected to the expansible envelope and enclosing a higher density phase of the phase change substance where the higher density phase conversion to the lower density phase is endothermic, a valve to control the lower density fluid phase flow between the expansible envelope and the tank, a source of fluid with a substantial hydrogen and oxygen content, and a primary surface;
controlling the object to ascend in an oblique glide;
simultaneously controlling the gross density of the object to remain lower than the density of the ambient adjacent fluid during the ascent;
simultaneously increasing the buoyancy by operating the valve to release the lower density fluid phase of the phase change substance from the tank into the expansible envelope;
simultaneously operating the source of fluid with a substantial hydrogen and oxygen content to provide fluid with a substantial hydrogen and oxygen content;
simultaneously combusting the fluid with a substantial hydrogen and oxygen content to produce a working fluid;
simultaneously introducing the working fluid into a target zone in the adjacent fluid near enough to the primary surface to provide a water vapor plume making contact with the primary surface;
simultaneously controlling conduction of heat from the primary surface to the phase change substance in the tank to maintain condensation of the water vapor plume and conversion of the phase change substance to the lower density fluid phase;
simultaneously recovering and storing the condensed water from the primary surface;
controlling the glide path of the object to maintain higher altitudes while converting the phase change substance lower density fluid phase to the higher density;
simultaneously controlling heat transfer from the phase change substance to the adjacent fluid;
simultaneously controlling the lower density fluid phase of the phase change substance to enter the tank and convert to the higher density phase of the phase change substance;
controlling the object to descend in either an oblique glide;

simultaneously controlling the gross density of the object to remain higher than the density of the ambient adjacent fluid during the descent;

simultaneously if necessary continuing to convert the lower density fluid phase of the phase change substance to the higher density phase of the phase change substance;

simultaneously retaining the higher density phase of the phase change substance in the tank;

simultaneously thermally insulating the tank;

simultaneously operating the source of fluid with a substantial hydrogen and oxygen content to provide and store the fluid with a substantial hydrogen and oxygen content;

controlling the object to maintain lower altitudes while converting the high density phase of the phase change substance to the low density fluid phase of the phase change substance;

simultaneously controlling the gross density of the object to remain equal to the density of the ambient adjacent fluid in order to hover the object;

simultaneously controlling heat transfer from the adjacent fluid to the high density phase of the phase change substance in the tank and providing heat from another source if the ambient adjacent fluid's temperature is too low;

and of repeating the steps in a cycle in order to further translate the object horizontally with net thrust and low resistance from the adjacent fluid, and to further convert gravitational and thermodynamic energy for other purposes.

* * * * *